US012267427B2

(12) United States Patent
Lee et al.

(10) Patent No.: US 12,267,427 B2
(45) Date of Patent: Apr. 1, 2025

(54) ACTIVE ACCESS AUTHENTICATION METHOD AND DEVICE USING THE SAME

(71) Applicant: MOCA SYSTEM INC., Seongnam-si (KR)

(72) Inventors: Seong Jik Lee, Yongin-si (KR); Jung Bin Yi, Suwon-si (KR); Jong Min Jeon, Seongnam-si (KR)

(73) Assignee: MOCA SYSTEM INC., Seongnam-si (KR)

( * ) Notice: Subject to any disclaimer, the term of this patent is extended or adjusted under 35 U.S.C. 154(b) by 0 days.

(21) Appl. No.: 18/779,552

(22) Filed: Jul. 22, 2024

(65) Prior Publication Data
US 2025/0047486 A1  Feb. 6, 2025

(30) Foreign Application Priority Data
Jul. 31, 2023  (KR) .................. 10-2023-0099689

(51) Int. Cl.
*H04L 9/32* (2006.01)
*G06F 21/30* (2013.01)
*G06F 21/31* (2013.01)
*H04W 12/06* (2021.01)

(52) U.S. Cl.
CPC .............. *H04L 9/321* (2013.01); *G06F 21/30* (2013.01); *G06F 21/31* (2013.01); *H04W 12/06* (2013.01)

(58) Field of Classification Search
CPC ......... H04L 9/321; G06F 21/30; G06F 21/31; H04W 12/06
See application file for complete search history.

(56) References Cited

U.S. PATENT DOCUMENTS

| 11,600,125 | B1 | 3/2023 | Hapgood et al. | |
| 2016/0063779 | A1* | 3/2016 | Libin ................. | G07C 3/00 340/5.6 |
| 2022/0358804 | A1* | 11/2022 | Inoue ................. | G07C 9/27 |
| 2022/0392286 | A1 | 12/2022 | Elrad et al. | |
| 2022/0417247 | A1 | 12/2022 | Choi et al. | |

FOREIGN PATENT DOCUMENTS

EP  2085934 A1  8/2009

OTHER PUBLICATIONS

European Search Report issued in corresponding application No. 24188694.4, dated Dec. 3, 2024.

* cited by examiner

*Primary Examiner* — Huan V Doan
(74) *Attorney, Agent, or Firm* — Maschoff Brennan

(57) ABSTRACT

An authentication method of a terminal according to an embodiment includes: receiving a first advertising packet from a control device; requesting an encryption key of the control device from a server based on at least one of control device identification information or region identification information which is included in the first advertising packet; receiving the encryption key of the control device from the server; determining whether the terminal has an authority to access the target region, based on at least one of the control device identification information or the region identification information; encrypting authentication data to be transmitted to the control device based on the encryption key of the control device when it is determined that the terminal has the authority to access the target region; and transmitting the encrypted authentication data to the control device.

20 Claims, 7 Drawing Sheets

ACTIVE ACCESS AUTHENTICATION METHOD AND DEVICE USING THE SAME

CROSS-REFERENCE TO RELATED APPLICATION(S)

This application is based on and claims priority under 35 U.S.C. § 119 to Korean Patent Application No. 10-2023-0099689, filed on Jul. 31, 2023, in the Korean Intellectual Property Office, the disclosure of which is herein incorporated by reference in its entirety.

BACKGROUND

Field

The disclosure relates to an access authentication method and a device using the same.

Description of Related Art

In the field of user authentication for managing access to a building or a specific region, payment processing, use in a specific device, techniques for enhancing convenience by utilizing user terminals are used. In such related-art techniques, a user terminal may be implemented by a card key or the like, and recently, terminals such as smartphones carried by users are widely used.

However, a terminal may require more time to acquire information necessary for user authentication than a related-art card key, and accordingly, inconvenience that causes a user to feel delay may occur.

In addition, in the case of related-art Bluetooth low energy (BLE) communication, there may be a problem that time required to perform communication varies according to an operating system of a terminal, or more time than a user thinks is required to transmit or receive data.

SUMMARY

An object to be achieved by the disclosure is to provide a control method for reducing time required to perform user authentication.

In addition, another object to be achieved by the disclosure is to provide a control method for preventing an error in user authentication according to an operating system of a terminal.

The objects to be achieved by the disclosure are not limited to those mentioned above, and other objects that are not mentioned above may be clearly understood to those skilled in the art based on the descriptions provided below and the accompanying drawings.

According to an embodiment, an authentication method of a terminal includes: receiving a first advertising packet from a control device, wherein the first advertising packet including at least one of control device identification information for identifying the control device or region identification information for identifying a target region that is managed by the control device; requesting an encryption key of the control device from a server based on at least one of the control device identification information or the region identification information which is included in the first advertising packet; receiving the encryption key of the control device from the server; determining whether the terminal has an authority to access the target region, based on at least one of the control device identification information or the region identification information; encrypting authentication data to be transmitted to the control device based on the encryption key of the control device when it is determined that the terminal has the authority to access the target region; and transmitting the encrypted authentication data to the control device.

The technical solving means of the disclosure is not limited to those mentioned above, and other technical solving means that are not mentioned above may be clearly understood to those skilled in the art based on the descriptions provided below and the accompanying drawings.

According to the disclosure, time required to perform user authentication can be reduced.

In addition, according to the disclosure, an error in user authentication which may be caused according to an operating system of a terminal can be prevented.

The effect of the disclosure is not limited to those mentioned above, and other effects that are not mentioned above may be clearly understood to those skilled in the art based on the descriptions provided below and the accompanying drawings.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
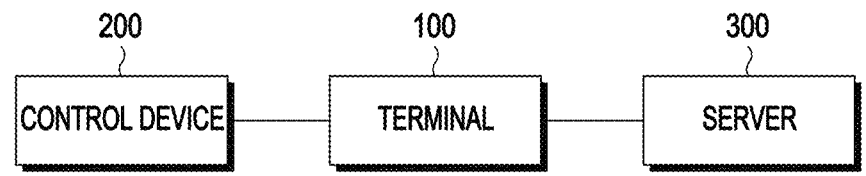
FIG. 1 is a view illustrating an environment of a management system according to an embodiment.

Embodiments described in the specification are provided to clearly describe the technical concept of the disclosure for those of ordinary skill in the art, and the disclosure is not limited to the embodiments set forth in the specification, and the scope of the disclosure should be interpreted as including various modifications or changes without departing from the technical concept of the disclosure.

The terms used in the specification are general terms that are widely used by considering functions of the disclosure, but the terms may vary depending on intentions of those of ordinary skill in the art, precedents or advent of new technologies. However, if a term is defined as having a certain meaning and is used, the meaning of the term will be specified separately. Accordingly, the terms used in the specification should be interpreted not based on the names of the terms but based on substantial meanings of the terms and contents described throughout the specification.

The drawings attached with the specification are provided to assist in an easy explanation of the disclosure, and shapes illustrated in the drawings may be displayed in an exaggerated way for easy understanding of the disclosure if necessary, and the disclosure is not limited by the drawings.

In the specification, detailed descriptions of well-known configurations or functions will be omitted since they would unnecessarily obscure the subject matters of the disclosure.

Hereinafter, an access management method and an access management device using the same according to an embodiment of the disclosure will be described.

FIG. 1 is a view illustrating an environment of a management system according to an embodiment.

Referring to FIG. 1, the management system 10 may include a terminal 100, a control device 200, and a server 300.

The terminal 100 may communicate with at least one of the control device 200 or the server 300, and may transmit or receive a variety of information. For example, the terminal 100 may transmit or receive information necessary for user authentication to or from the control device 200. Herein, user authentication may refer to authentication that is performed to determine whether a user or a user terminal has a specific authority. For example, user authentication may include authentication of various authorities, such as access authority authentication on whether a user or a user terminal has an authority to access a specific region, payment authority authentication on whether a user or a user terminal has an authority to perform payment processing, using authority authentication on whether a user or a user terminal has an authority to use a specific device, and operation mode setting authentication on whether a user or a user terminal has an authority to set an operation mode of a specific device.

In addition, the terminal 100 may transmit an access request and/or data necessary for the access request to the control device 200 or the server 300. In addition, according to an embodiment, the terminal 100 may perform the above-described user authentication.

In addition, when user authentication is performed, the terminal 100 may request the control device 200 or the server 300 to process user authentication, and may acquire a result of the request for processing for user authentication from the control device 200 or the server 300. In addition, the terminal 100 may acquire information on whether it is possible to perform processing for user authentication from the control device 200 or the server 300, and may perform processing for user authentication based on the information.

In addition, an application for conducting some embodiments, which will be described below, may be provided to the terminal 100.

The terminal 100 may be implemented by a smartphone, a tablet, a personal digital assistant (PDA), a laptop, a wearable device, or the like. Alternatively, the terminal 100 may be implemented by a smart card, an integrated circuit (IC) card, a magnetic card, a radio frequency (RF) chip which is capable of recording data, or the like.

The control device 200 may communicate with at least one of the server 300 or the terminal 100, and may transmit or receive a variety of information. In addition, the control device 200 may perform various processing operations according to a user authentication result described above. For example, the control device 200 may control access by a user to a specific region, may control payment processing of a user, may control use of a specific device by a user, or may control an operation mode of a specific device according to a user authentication result.

Specifically, when access by a user to a specific region is restricted by a gate, the control device 200 may control the gate to control the access by the user to the specific region according to a user authentication result. Herein, the gate may be a device that physically restricts access by a user, and may include an access restriction device (for example, an access bar, an access door, etc.). The control device 200 may provide an unlock signal to the gate according to a user authentication result to control the gate to be opened and allow access by a user. In addition, the control device 200 may not provide the unlock signal to the gate or may provide a lock signal to the gate according to a user authentication result to control the gate to be closed and to prevent access by a user. In addition, according to an embodiment, the control device 200 may be disposed inside or outside the gate.

In addition, when the control device 200 controls payment processing, the control device 200 may perform a payment authorization procedure as a process according to a user authentication result. For example, the control device 200 may receive a payment request from the terminal 100 and may accept or refuse the payment request based on a user authentication result. In addition, according to an embodiment, the payment authorization procedure may be performed in the terminal 100 or the server 300.

In addition, the control device 200 may perform various control operations based on a user authentication result. For example, when the control device 200 controls a gate for accessing a public transportation, the control device 200 may control the gate based on a payment authorization result. In addition, the control device 200 may provide the payment authorization result to at least one of the server 300 or the terminal 100. In addition, when the control device 200 controls use of a specific device according to a user authentication result, the control device 200 may control the use of the specific device through software installed in the specific device, or may control the use of the specific device by controlling a restriction device for physically restricting the use of the specific device, based on a user authentication result.

In addition, when the control device 200 controls an operation mode of a specific device, the control device 200 may configure the operation mode of the specific device based on a user authentication result. For example, when the control device 200 controls an access control device for managing access to a specific region, the control device 200 may control the access control device in a security mode for increasing a security level in the specific region, or may control the access control device in a normal mode in which the security mode is disabled according to a user authentication result. In addition, according to an embodiment, the access control device may be included in the control device 200.

Various processing operations performed according to a user authentication result may also be performed in the server 300 or the terminal 100.

In addition, according to an embodiment, the control device 200 may perform the above-described operation for user authentication. When user authentication is performed, the control device 200 may request the terminal 100 or the server 300 to process user authentication, and may acquire a result of the request for processing from the terminal 100 or the server 300. In addition, the control device 200 may acquire a result on whether it is possible to perform processing for user authentication from the terminal 100 or the server 300, and may perform processing for user authentication based on the result.

The server 300 may communicate with at least one of the control device 200 or the terminal 100, and may transmit or receive a variety of information.

According to an embodiment, the server 300 may provide information necessary for user authentication to at least one of the control device 200 or the terminal 100. In addition, the server 300 may perform the user authentication and may provide a result of the user authentication to at least one of the control device 200 or the terminal 100. In addition, when the user authentication is performed in at least one of the control device 200 or the terminal 100, the server 300 may acquire a result of user authentication from at least one of the control device 200 or the terminal 100.

The server 300 may perform processing according to the user authentication. For example, upon receiving a request for processing for user authentication from the terminal 100 or control device 200, the server 300 may perform processing according to the user request or may determine whether the processing according to the user request will be performed by the terminal 100 or control device 200, and may provide a result of determining to the terminal 100 or the control device 200. Herein, the processing for the user authentication may refer to a follow-up operation that is performed based on user authentication, such as controlling access to a specific region by a user, controlling payment processing of a user, controlling use of a specific device by a user, controlling an operation mode of a specific device according to a user authentication result.

However, the diagram of the environment illustrated in FIG. 1 is merely an example for the convenience of explanation and the disclosure is not limited thereto. According to some embodiments, components may be added to the diagram of the environment of FIG. 1 or may be omitted, and also, may be divided.

Figure 2:
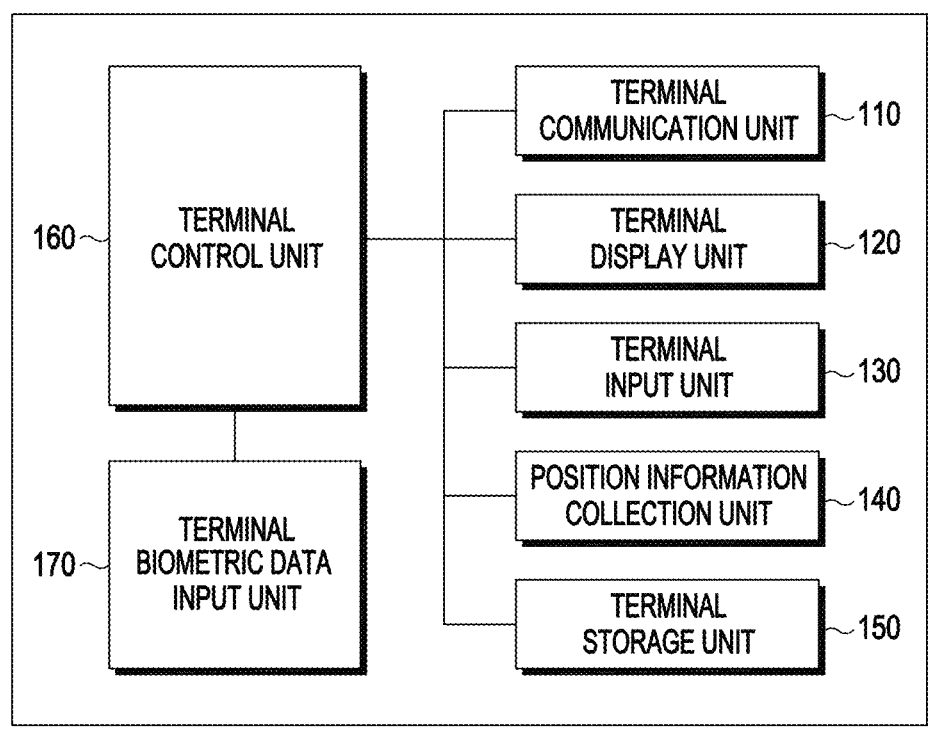
FIG. 2 is a block diagram of a terminal according to an embodiment.

FIG. 2 is a block diagram of the terminal according to an embodiment.

Referring to FIG. 2, the terminal 100 may include a terminal communication unit 110, a terminal display unit 120, a terminal input unit 130, a position information collection unit 140, a terminal storage unit 150, a terminal control unit 160, and a terminal biometric data input unit 170.

The terminal communication unit 110 may communicate with at least one of the server 300 or the control device 200. For example, the terminal communication unit 110 may transmit or receive information necessary for user authentication or information on a user authentication result to or from at least one of the server 300 or the control device 200.

In addition, the terminal communication unit 110 may include a mobile communication module employing Bluetooth low energy (BLE), Bluetooth, wireless local area network (WLAN), Wireless Fidelity (WiFi), WiFi Direct, near field communication (NFC), infrared data association (IrDA), ultra wide band (UWB), Zigbee, $3^{rd}$ generation (3G), 4G, or 5G, and a wired or wireless module to transmit or receive data through various other communication standards.

The terminal display unit 120 may output a variety of visual information. For example, when the control device 200 is detected through communication with the control device 200 and a communication connection is established, the terminal display unit 120 may output relevant information. In addition, the terminal display unit 120 may visually output a user authentication result. In addition, the terminal display unit 120 may visually output a message received from the server 300.

The terminal display unit 120 may be a liquid crystal display (LCD), an organic light emitting diode (OLED), an active matrix organic LED (AMOLED) display, or the like. When the terminal display unit 120 is provided as a touch screen, the terminal display unit 120 may perform a function of the terminal input unit 130. In this case, a separate terminal input unit 130 may not be provided according to selection, and the terminal input unit 130 performing a limited function, such as volume control, power button, and a home button, may be provided.

The terminal input unit 130 may acquire a signal corresponding to a user input. For example, the terminal input unit 130 may acquire an input for requesting user authentication from the server 300 or the control device 200. In addition, the terminal input unit 130 may acquire an input for acquiring information necessary for user authentication (for example, user authority information, user private information (or identification information of a user or a terminal, identification information necessary for payment processing (for example, card information of a user, authentication information corresponding to card information), user biometric data, encryption information, etc.)).

In addition, the terminal input unit 130 may be implemented by a keyboard, a key pad, a button, a jog shuttle, a wheel or the like. In addition, the user input may be, for example, pressing of a button, touch and drag. When the terminal input unit 120 is implemented by a touch screen, the terminal display unit 120 may perform the role of the terminal input unit 130.

The position information collection unit 140 may acquire position information for identifying a position of the terminal 100. For example, the position information collection unit 140 may acquire coordinate information for determining a position like a global positioning system (GPS) sensor. In another example, the position information collection unit 140 may determine the position of the terminal 100 based on a signal received from an external device. For example, when the terminal 100 receives a signal indicating a specific region from the control device 200, the terminal 100 may identify that the terminal 100 is in the specific region in response to reception of the signal.

In addition, the terminal storage unit 150 may store various data. For example, the terminal storage unit 150 may store data necessary for operations of the terminal 100 (for example, information necessary for user authentication (for example, user authority information, user private information (or identification information of a user or a terminal, identification information necessary for payment processing (for example, card information of a user, authentication information corresponding to card information), user biometric data, encryption information, etc.))).

The terminal storage unit 150 may include a storage medium of at least one type of a flash memory type, a hard disk type, a multimedia card micro type, a memory of a card type (for example, a SD or XD memory), a random access memory (RAM), a static random access memory (SRAM), a read only memory (ROM), an electrically erasable programmable read-only memory (EEPROM), a programmable read-only memory (PROM) magnetic memory, a magnetic disk, an optical disk. The memory may store information temporarily, permanently, or semi-permanently, and may be provided in an embedded type or a removable type.

The terminal control unit 160 may control respective components of the terminal 100 or may process or compute a variety of information. In addition, the terminal control unit 160 may acquire signals from some components included in the terminal 100. In addition, the terminal control unit 160 may control operations for performing some steps performed in the terminal 100 among the steps of methods which will be described below, or may perform computation necessary for performing the steps.

The terminal control unit 160 may be implemented by software, hardware, and a combination thereof. For example, in terms of hardware, the terminal control unit 160 may be implemented by a field programmable gate array (FPGA), an application specific integrated circuit (ASIC), a semiconductor chip, and electronic chips of various other types. In another example, in terms of software, the terminal control unit 160 may be implemented by a logic program or various computer languages which are performed according to the above-described hardware.

The terminal biometric data input unit 170 may receive biometric data of a user. The biometric data may refer to at least one of voice, fingerprint, iris, face, and vein information of the user. The terminal biometric data input unit 170 may be implemented by at least one of a microphone to which voice information of a user is inputted, a screen scanner to which fingerprint information of a user is inputted, a camera to which iris, face, vein information of a user is inputted.

The terminal 100 may not necessarily include all of the above-described components, and some components may be omitted according to selection. For example, when the terminal 100 does not receive biometric data, the terminal 100 may be provided without the terminal biometric data input unit 170. In addition, the terminal 100 may be provided with a component added to perform an additional function and operation according to selection.

Figure 3:
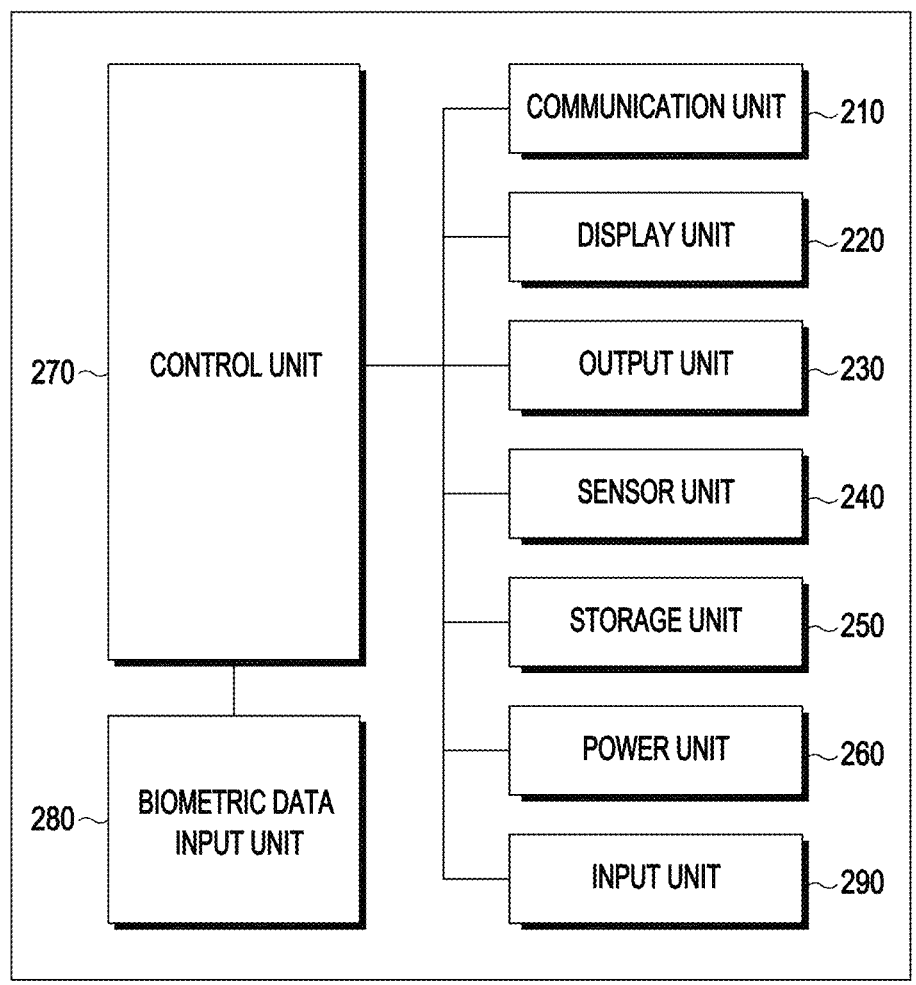
FIG. 3 is a block diagram of a control device according to an embodiment.

FIG. 3 is a block diagram of the control device according to an embodiment.

Referring to FIG. 3, the control device 200 may include a communication unit 210, a display unit 220, an output unit 230, a sensor unit 240, a storage unit 250, a power unit 260, a control unit 270, a biometric data input unit 280, and an input unit 290.

The communication unit 210 may communicate with at least one of the server 300 or the terminal 100. For example, the communication unit 210 may transmit or receive information necessary for user authentication or user authentication result information to or from at least one of the server 300 or the terminal 100.

The communication unit 210 may generally perform communication according to wireless communication standards, and may include a mobile communication module employing BLE, Bluetooth, WLAN, WiFi, WiFi Direct, NFC, IrDA, UWB, Zigbee, 3G, 4G, or 5G, and a wired or wireless module to transmit data through various other communication standards. In addition, the communication unit 210 may include a short-range wireless module that supports NFC, radio frequency identification (RFID).

The display unit 220 may output information to be visually provided to a user. For example, when a door open signal is received, the display unit 220 may output visual information indicating the reception of the door open signal.

The display unit 220 may be an LCD, an OLED, an AMOLED display. When the display unit 220 includes a touch panel, the display unit 220 may operate as an input device which is based on a touch input.

The output unit 230 may output information to be acoustically provided to a user. For example, when the door open signal is received, the output unit 230 may output auditory information indicating the reception of the door open signal. In addition, when a setting change signal is received, the output unit 230 may output auditory information indicating the reception of the setting change signal.

The output unit 230 may be a speaker or a buzzer to output a sound.

The sensor unit 240 may acquire a signal regarding an external environment that is necessary for the control device 200. For example, the sensor unit 240 may identify whether there exists a movable object (for example, a user) in the proximity of the control device 200. In addition, the sensor unit 240 may be disposed in the control device 200 or may be disposed in the proximity of the control device 200. According to an embodiment, the sensor unit 240 may not be included in the control device 200. In this case, a separate sensor may be disposed in the proximity of the control device 200.

A variety of information may be stored in the storage unit 250. For example, the storage unit 250 may store a program for performing a control operation of the control unit 270, and may store data received from the outside and data generated in the control unit 270. In addition, the storage unit 250 may store information necessary for operations of the control device 200 (for example, information necessary for user authentication (for example, user authority information, identification information of a user (for example, identifier information of a user or a user terminal, biometric data of a user, encryption information))), and user authentication result information.

The storage unit 250 may include a storage medium of at least one type of a flash memory type, a hard disk type, a multimedia card micro type, a memory of a card type (for example, a SD or XD memory), a RAM, a SRAM, a ROM, an EEPROM, a PROM magnetic memory, a magnetic disk, an optical disk. The memory may store information temporarily, permanently, or semi-permanently, and may be provided in an embedded type or a removable type.

The power unit 260 may provide a power necessary for locking or unlocking a gate. In addition, the power unit 260 may provide a power necessary for opening or closing a gate. The power unit 260 may be provided as a motor, a solenoid, or an actuator.

When the power unit 260 provides a power necessary for locking or unlocking a gate, the power unit 260 may provide a power to change and/or maintain a lock unit (not shown) for locking or unlocking the gate to go into a lock or unlock state. The lock unit may be provided as a deadbolt, a latch bolt, or a combination thereof. In addition, the lock unit is not limited to the deadbolt and the latch bolt, and typical lock units may be used.

According to an embodiment, the power unit 260 may be included in the control device 200 or may not be included in the control device 200. In addition, the power unit 260 may be disposed in the proximity of the control device 200 in the form of a separate device. In this case, the control device 200 may provide a signal for controlling the power unit 260 to the power unit 260. In addition, the lock unit described above may be included in the control device 200, or may be disposed in the proximity of the control device 200 to receive control of the control device 200.

The control unit 270 may control respective components of the control device 200 or may process and compute a variety of information. The control unit 270 may acquire signals from some components included in the control device 200. In addition, the control unit 270 may control operations for performing some steps performed in the control device 200 among the steps of the methods which will be described below, or may perform computation necessary for performing the steps.

The control unit 270 may be implemented by software, hardware, and a combination thereof. For example, in terms of hardware, the control unit 270 may be implemented by a FPGA, an ASIC, a semiconductor chip, or electronic circuits of various types. For example, in terms of software, the control unit 270 may be implemented by a logic program or various computer languages which are performed according to the above-described hardware.

The biometric data input unit 280 may receive an input of biometric data of a user. For example, the biometric data input unit 280 may receive at least one of voice, fingerprint, iris, face and vein information of a user. The biometric data input unit 280 may be implemented by at least one of a microphone to which voice information of a user is inputted, a screen scanner to which fingerprint information of a user is inputted, or a camera to which iris, face, vein information of a user is inputted.

The input unit 290 may be configured to receive various inputs. For example, the input unit 290 may acquire an input for requesting user authentication from the server 300 or the terminal 100. In addition, the input unit 290 may acquire an input for acquiring information necessary for user authentication (for example, identification information of a user or user terminal, encryption information, biometric data). In addition, the input unit 290 may receive an input of setting change information for changing setting of the control device 200.

In addition, the input unit 290 may receive an input of a user authentication request from a user. For example, when user authentication is authentication of user's access to a specific region, the control device 200 may receive an input for opening a door, and may open the door by actuating the power unit 260, or may transmit an access authentication request signal to the server 300 or the terminal 100. For example, the input unit 290 may be implemented by a keyboard, a key pad, a button, a switch, a jog shuttle, a wheel or the like. In addition, the user's input may be, for example, pressing of a switch, pressing of a button, touch and drag. When the display unit 220 is implemented by a touch screen, the display unit 220 may perform the role of the input unit 290.

The control device 200 according to an embodiment of the disclosure does not necessarily include all of the above-described components, and some components may be omitted according to selection.

For example, the control device 200 may include a control device 200 including a communication unit 210 and a control unit 270. More specifically, the control device 200 may perform a function of receiving information that is acquired from the terminal 100 through the communication unit 210 performing a function of a reader, analyzing the acquired information through the control unit 270 performing a function of a controller, and controlling operations such as access management, attendance and absence management, system mode change.

In addition, the control device 200 may be provided with a component added to perform an additional function and operation according to selection.

Figure 4:
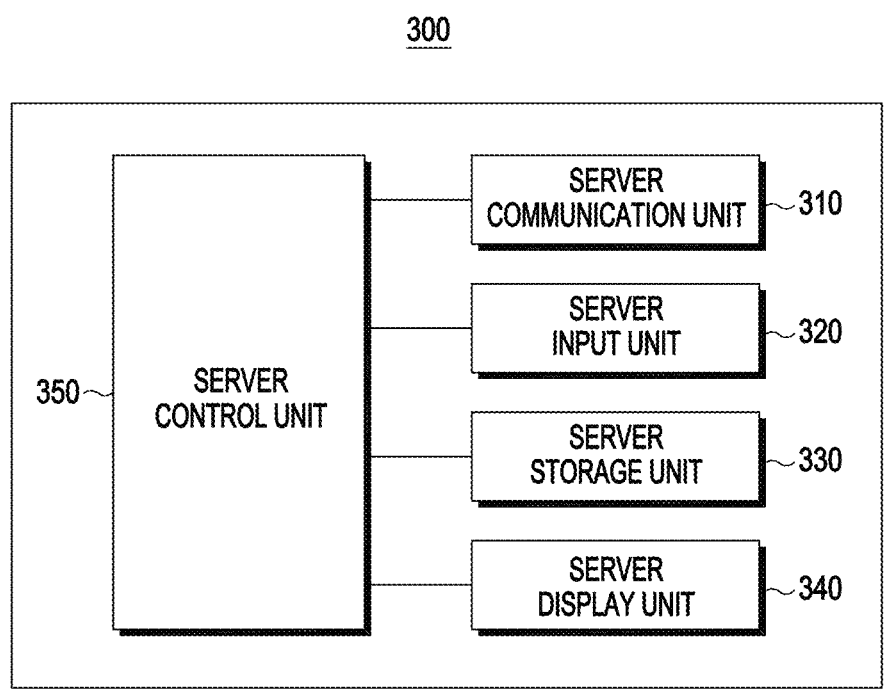
FIG. 4 is a block diagram of a server according to an embodiment.

FIG. 4 is a block diagram of the server according to an embodiment.

Referring to FIG. 4, the server 300 may include a server communication unit 310, a server input unit 320, a server storage unit 330, a server display unit 340, and a server control unit 350.

The server communication unit 310 may communicate with at least one of the terminal 100 or the control device 200. In another example, the server communication unit 310 may transmit biometric data to be stored in the control device 200 to the terminal 100.

In addition, the server communication unit 310 may include a mobile communication module employing BLE, Bluetooth, WLAN, WiFi, WiFi Direct, NFC, IrDA, UWB, Zigbee, 3G, 4G, or 5G, and a wired or wireless module to transmit data through various other communication standards.

The server input unit 320 may acquire an electric signal corresponding to a user input. The server input unit 320 may include a keypad, a keyboard, a switch, a button, and a touch screen.

The server storage unit 330 may store various data. For example, the server storage unit 330 may store information necessary for user authentication (for example, user authority information, user private information (or identification information of a user or a terminal, identification information necessary for payment processing (for example, card information of a user, authentication information corresponding to card information), biometric data of a user, encryption information)), or information on a user authentication result.

In addition, the server storage unit 330 may store information acquired from the terminal 100 or the control device 200. In addition, the server storage unit 330 may store a program necessary for operations of the server 300.

In addition, the sever storage unit 330 may include a storage medium of at least one type of a flash memory type, a hard disk type, a multimedia card micro type, a memory of a card type (for example, a SD or XD memory), a RAM, a SRAM, a ROM, an EEPROM, a PROM magnetic memory, a magnetic disk, an optical disk. In addition, the memory may store information temporarily, permanently, or semi-permanently, and may be provided in an embedded type or a removable type.

The server display unit 340 may output visual information. For example, the server display unit 340 may be an LCD, an OLED, an AMOLED display.

In addition, the server control unit 350 may control respective components of the server 300 or may process and compute a variety of information. In addition, the server control unit 350 may control operations for performing some steps performed in the server 300 among the steps of the methods which will be described below, or may perform computation necessary for performing the steps.

The server control unit 350 may be implemented by software, hardware, and a combination thereof. For example, in terms of hardware, the server control unit 350 may be implemented by a FPGA, an ASIC, a semiconductor chip, or electronic circuits of various types. For example, in terms of software, the server control unit 350 may be implemented by a logic program or various computer languages which are performed according to the above-described hardware.

The server 300 does not necessarily include all of the above-described components, and some components may be omitted according to selection. For example, when the server 300 does not directly provide visual information, the server 300 may be provided without the server display unit 340. In addition, the server 300 may be provided with a component added to perform an additional function and operation according to selection.

Figure 5:
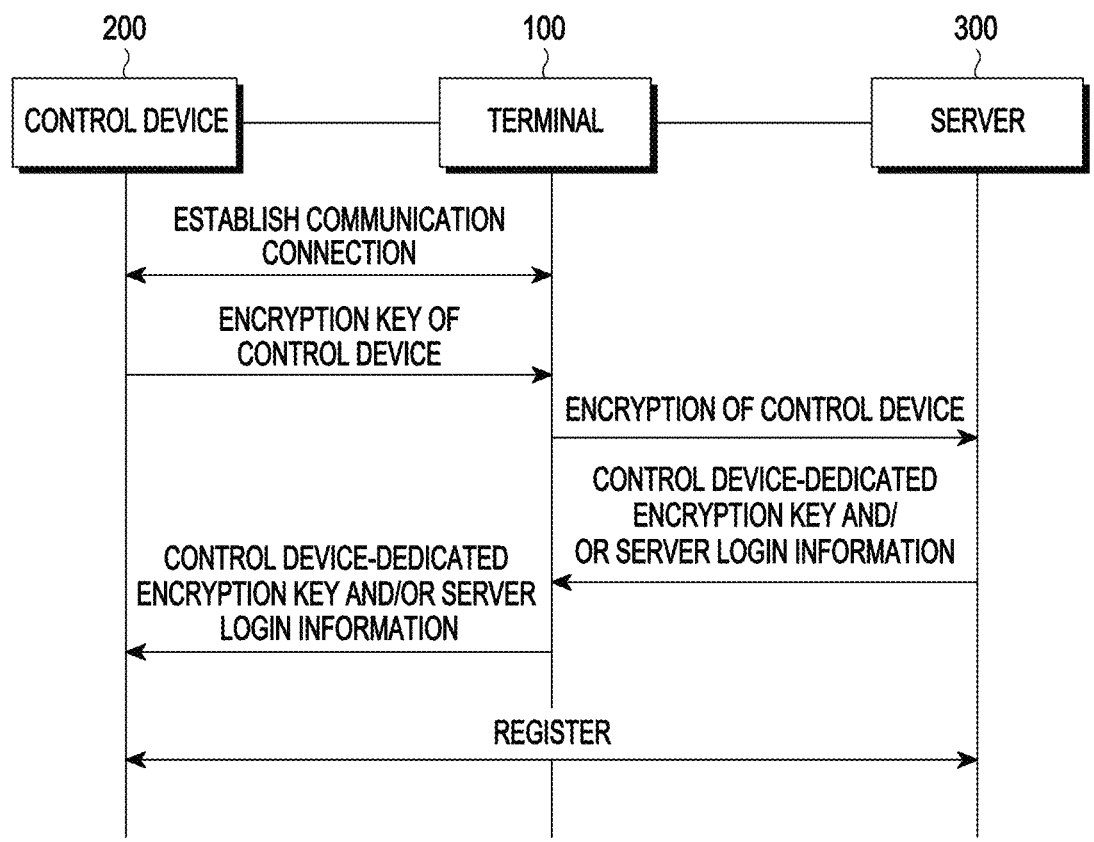
FIG. 5 is a view provided to explain registration of the control device at the server according to an embodiment.

FIG. 5 is a view provided to explain registration of the control device at the server according to an embodiment.

Referring to FIG. 5, a communication connection may be established between the control device 200 and the terminal 100. For example, when communication is performed between the control device 200 and the terminal 100 by using a BLE communication protocol, the control device 200 may broadcast an advertising packet. When the terminal 100 is positioned at a predetermined distance from the control device 200, the terminal 100 may receive the advertising packet from the control device 200 and may perform scanning in response to reception of the advertising packet. After scanning is performed by the terminal 100, the control device 200 and the terminal 100 may be communicably connected with each other, such that a communication channel is established between the control device 200 and the terminal 100. Hereinafter, for the convenience of explanation, it will be explained that communication is performed between the control device 200 and the terminal 100 by using the BLE communication protocol, but this should not be considered as limiting. Communication may be performed between the control device 200 and the terminal 100 by using various communication protocols (for example, a Bluetooth communication protocol, a UWB communication protocol, or the like).

In addition, the control device 200 may transmit an encryption key of the control device to the terminal 100. In an embodiment, the control device 200 may store the encryption key at the time of manufacturing, or may acquire the encryption key from the server or another device. In addition, the encryption key may be a public key.

In addition, the terminal 100 may transmit the acquired encryption key of the control device 200 to the server 300.

In this case, according to an embodiment, the terminal 100 may acquire identification information of the control device 200 (for example, a device serial number of the control device 200) and/or region identification information for identifying a region that is managed by the control device 200. The identification information and/or region identification information of the control device 200 may be included in the advertising packet which is broadcasted by the control device 200, and may be received by the terminal 100 from the control device 200 after a communication connection is established between the control device 200 and the terminal 100. The terminal 100 may transmit the identification information and/or region identification information of the control device 200 when transmitting the encryption key of the control device 200 to the server 300.

In addition, the server 300 may transmit a control device-dedicated encryption key to the terminal 100 in response to reception of the encryption key of the control device 200. The control device-dedicated encryption key may be an encryption key that is assigned only to the control device 200, and the server 300 may set any one of encryption keys pre-stored as the control device-dedicated encryption key, or may newly generate the control device-dedicated encryption key. For example, the server 300 may generate the control device-dedicated encryption key based on the encryption key of the control device 200. In addition, the control device-dedicated encryption key may be a control device-dedicated public key. In addition, the control device-dedicated encryption key may be used for the control device 200 to verify authentication data acquired from the terminal 100 when user authentication is performed.

The server 300 may match the identification information and/or region identification information of the control device 200 with the control device-dedicated encryption key, and may store the matched information. In addition, when the server 300 transmits the control device-dedicated encryption key to the terminal 100, the control device 200 may be managed as a registered control device 200.

In addition, in an embodiment, the server 300 may transmit server login information to the terminal 100 in response to reception of the encryption key of the control device 200. Herein, the server login information may include information for accessing the server 300, and may include identification information for accessing the server 300 and a password (or an encryption key) for accessing the server 300. According to an embodiment, the identification information for accessing the server 300 and the password for accessing the server 300 may be generated only for the control device 200. When the control device 200 is able to perform communication with the server 300, the control device 200 may access the server 300 by using the server login information received from the terminal 100. In addition, after accessing the server 300, the control device 200 may acquire the above-described control device-dedicated encryption key from the server 300.

In addition, when the server 300 transmits the server login information to the terminal 100, the server 300 may store the identification information and/or region identification of the control device 200. In addition, when the server 300 transmits the server login information to the terminal 100, the server 300 may manage the control device 200 as a registered control device 200.

In addition, the terminal 100 may acquire the control device-dedicated encryption key and/or server login information, and may transmit the acquired control device-dedicated encryption key and/or server login information to the control device 200. In addition, according to an embodiment, the terminal 100 may acquire information regarding the server 300 (for example, identification information of the server 300) from the server 300. In this case, the terminal 100 may transmit the information regarding the server 300 to the control device 200.

The control device 200 may store the control device-dedicated encryption key received from the terminal 100. In addition, the control device 200 may acquire the information regarding the server 300 from the terminal 100, and may store the information regarding the server 300. The control device 200 acquires the control device-dedicated encryption key, so that the control device 200 can be registered at the server 300 without performing direct communication between the control device 200 and the server 300.

In addition, the control device 200 may store the server login information received from the terminal 100. The control device 200 may acquire the server login information and may access the server 300 by using the server login information. Accordingly, the control device 200 may be registered at the server 300 early in the registering process without performing direct communication with the server 300.

As the control device 200 is registered at the server 300, the terminal 100 may acquire information necessary for user authentication from the server 300, and may access the control device 200 registered at the server 300 by using the information necessary for user authentication.

Figure 6:
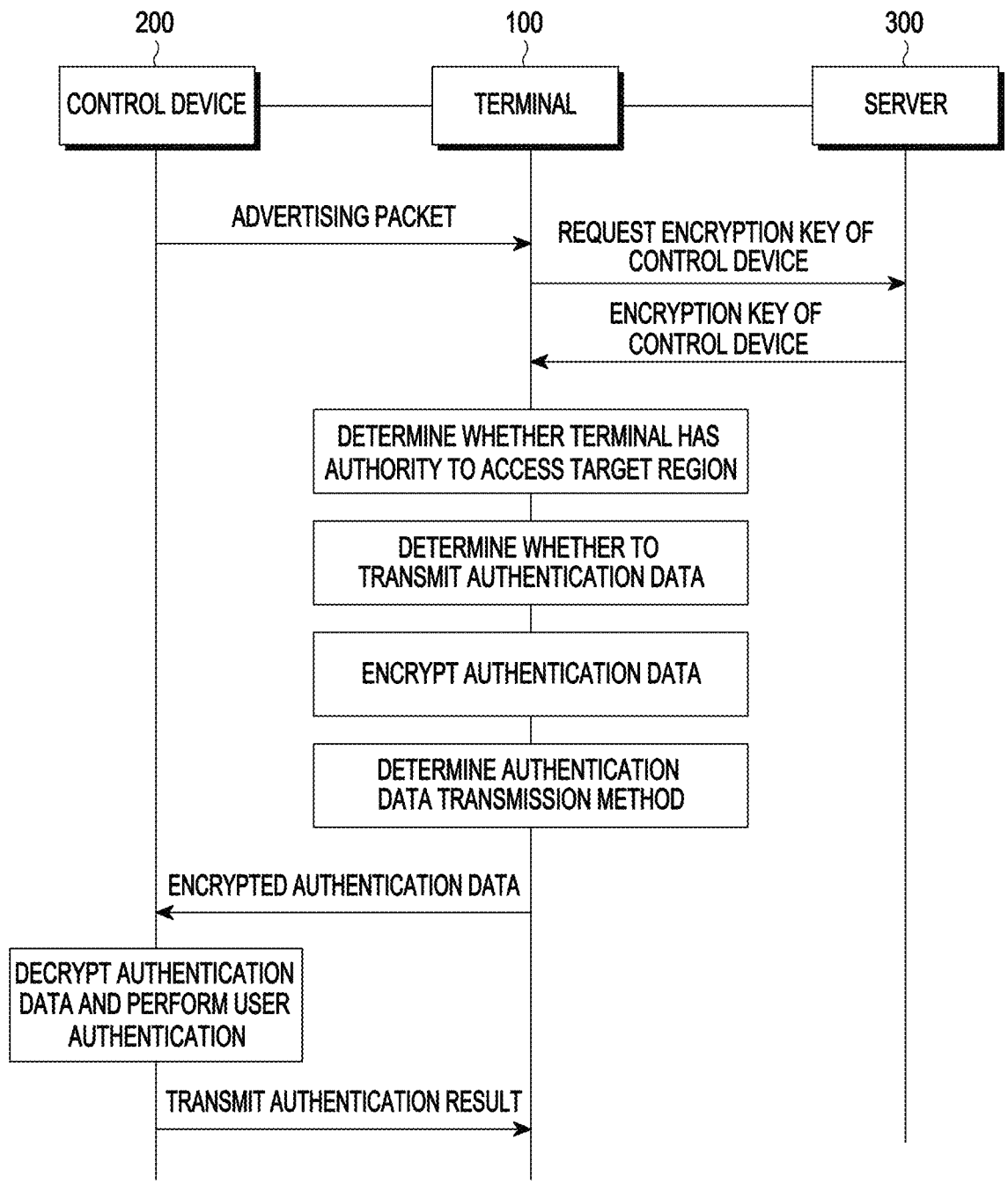
FIG. 6 is a view provided to explain a user authentication method according to an embodiment.

FIG. 6 is a view provided to explain a user authentication method according to an embodiment.

Referring to FIG. 6, the control device 200 may broadcast an advertising packet. When the terminal 100 is positioned at a predetermined distance from the control device 200, the terminal 100 may receive the advertising packet from the control device 200. In this case, the advertising packet may include at least one of identification information of the control device 200 (for example, a device serial number of the control device 200), region identification information for identifying a region that is managed by the control device 200, a random value, version information of a communication protocol through which the control device 200 communicates (for example, version information of a communication protocol corresponding to the advertising packet, such as version information of a BLE communication protocol), or information regarding a model type of the control device 200.

In response to reception of the advertising packet, the terminal 100 may request an encryption key of the control device 200 from the server 300. For example, the encryption key of the control device 200 may include a public key of the control device 200 described above with reference to FIG. 5

In addition, the server 300 may transmit the encryption key of the control device 200 to the terminal 100. In an embodiment, the terminal 100 may provide the identification information and/or region identification information of the control device 200, which is included in the advertising packet, to the server 300. In addition, the server 300 may identify the encryption key of the control device 200 among pre-stored encryption keys, based on the identification information and/or region identification information of the control device 200 which is acquired from the terminal 100, and may transmit the identified encryption key of the control device 200 to the terminal 100.

In addition, the terminal 100 may perform scanning with respect to the control device 200. The terminal 100 may perform scanning with respect to the control device 200 after receiving the advertising packet from the control device 200, or may perform scanning after requesting the encryption key of the control device 200 from the server 300.

In addition, the terminal 100 may determine whether the terminal 100 has an authority to access a target region. Herein, the target region refers to a region that is controlled by the control device 200, and a region that is controlled by the control device 200 is expressed as a target region for the convenience of explanation, but according to an embodiment, it is obvious that the explanation of the disclosure is applied to access to the control device 200 and access to a target device indicating a region that is controlled by the control device 200.

Specifically, the terminal 100 may pre-store reference access authority information. The reference access authority information may include identification information of the control device that the terminal 100 or the user of the terminal 100 has an authority to access, and/or region identification information that is managed by the control device.

In the following descriptions, it is explained for the convenience of explanation that the identification information of the control device that the terminal 100 or the user of the terminal 100 has the authority to access is included as reference control device identification information, and the region identification information managed by the control device that the terminal 100 or the user of the terminal 100 has the authority to access is expressed as reference region identification information. For example, the terminal 100 may acquire and store the reference control device identification information and/or reference region identification information from the server.

In addition, the reference control device identification information and the reference region identification information may be stored in an application of the terminal 100 in the form of a card.

In this case, the reference control device identification information and the reference region identification information may be stored in a different card form according to each control device and/or a region that is managed by each control device. In addition, when a card that includes reference control device identification information and/or reference region identification information corresponding to the control device 200 is selected in an application of the terminal 100, the terminal 100 may access the control device 200 and/or the region that is managed by the control device 200.

For example, the terminal 100 may receive selection of the card including the reference control device identification information and/or the reference region identification information corresponding to the control device 200 according to a user input, or may select the card including the reference control device identification information and/or the reference region identification information corresponding to the control device 200 among a plurality of cards, based on the identification information and/or region identification information of the control device 200, which is received from the control device 200.

In addition, the terminal 100 may compare the identification information and/or region identification information of the control device 200, which is received from the control device 200, and the reference control device identification information and/or reference region identification information (that is, reference access authority information), and, when the identification information and/or region identification information of the control device 200, received from the control device 200, is included in the reference control device identification information and/or reference region identification information, the terminal 100 may determine that the terminal has the authority to access the target region.

According to an embodiment, when a card is selected in the application of the terminal 100, the terminal 100 may compare reference control device identification information and/or reference region identification information corresponding to the corresponding card, and the identification information and/or the region identification information of the control device 200 which is received from the control device 200, and may determine whether the terminal 100 has the authority to access the target region.

In a related-art method, when the terminal 100 tries to perform user authentication with respect to the control device 200, the control device 200 may determine whether the terminal 100 or the user of the terminal 100 has the authority to access the target region. However, according to the disclosure as described above, the terminal 100 may determine whether the terminal 100 or the user of the terminal 100 has the authority to access the target region in advance before trying to perform user authentication with respect to the control device 200, so that the terminal 100 rather than the control device 200 can have the discretion to authenticate the user.

In addition, the terminal 100 may determine whether to transmit authentication data to the control device 200. Specifically, the terminal 100 may determine whether the user of the terminal 100 has an intention of accessing the target region. When the terminal 100 determines that the user of the terminal 100 has the intention of accessing the target region and has the authority to access the target region, the terminal 100 may determine to transmit authentication data to the control device 200. For example, when the terminal 100 is positioned at a predetermined threshold distance from the control device 200, the terminal 100 may determine that the user has the intention of accessing the target region. When the terminal 100 is positioned far away from the control device 200 by longer than the predetermined threshold distance, the terminal 100 may determine that the user has no intention of accessing the target region. The predetermined distance may be set differently according to the terminal 100 and/or the control device 200. This will be described below with reference to FIG. 7.

Figure 7:
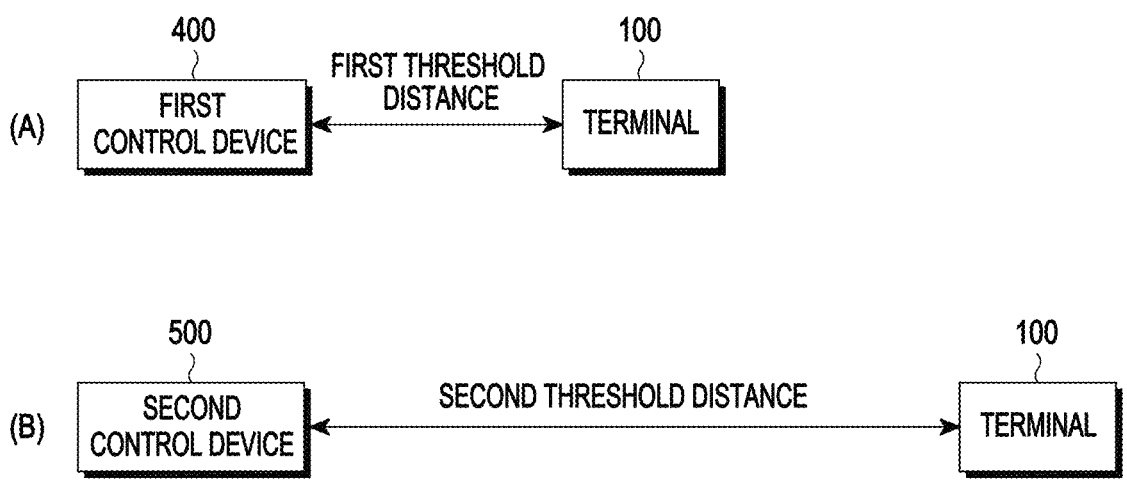
FIG. 7 is a view provided to explain a threshold distance between the terminal and the control device according to an embodiment.

FIG. 7 is a view provided to explain a threshold distance between the terminal and the control device according to an embodiment.

Referring to FIG. 7, the terminal 100 may determine a distance to the control device 400, 500 by using a signal exchanged with the control device 400, 500. For example, the terminal 100 may receive a signal (for example, a signal including an advertising packet) from the control device 400, 500, may calculate a received signal strength indicator (RSSI) value based on the signal received from the control device 400, 500, and may determine a distance to the control device 400, 500 based on the RSSI value.

In the case of (A), when the terminal 100 determines that the distance to the first control device 400 is within a first threshold distance, the terminal 100 may determine that the user has an intention of accessing the first control device 400 or a region/device that is controlled by the first control device 400 (hereinafter, referred to as a first target region).

In the case of (B), when the terminal 100 determines that the distance to the second control device 500 is within a second threshold distance, the terminal 100 may determine that the user has an intention of accessing the second control device 500 or a region/device that is controlled by the second control device 500 (hereinafter, referred to as a second target region). In this case, the second threshold distance may be longer than the first threshold distance.

In an embodiment, since the first threshold distance is shorter than the second threshold distance, the terminal 100 may determine that the user has the intention of accessing the first target region only if the terminal 100 is tagged on the first control device 400. In addition, when the terminal 100 is positioned in a user's pocket or the user is walking toward the second control device 500 while holding the terminal 100, the terminal 100 may determine that the user has the intention of accessing the second target region only if the terminal 100 is positioned within the second threshold distance from the second control device 500 even though the user does not tag the terminal 100 on the second control device 500.

In addition, in order to apply the second threshold distance to determining whether the user has the intention of accessing the second target region as in the case of (B), the second control device 500 may be pre-registered at the server as a second threshold distance application control device (hereinafter, referred to as a walk-through control device).

For example, the second control device 500 may be registered by the terminal 100 as a walk-through control device. For example, the terminal 100 may register the second control device 500 at the server as a walk-through control device, by providing identification information of the second control device 500 and/or region identification information of a region that is managed by the second control device 500 to the server. Thereafter, the terminal 100 may receive an advertising packet from the second control device 500, may acquire identification information and/or region identification information of the second control device 500 from the advertising packet, and may identify that the second control device 500 has been registered at the server as a walk-through control device, based on the identification information and/or region identification information of the second control device 500. In this case, the terminal 100 may apply the second threshold distance to determining whether the user has the intention of accessing the second target region. In addition, when the terminal 100 receives an advertising packet from the first control device 400 and acquires identification information and/or region identification information of the first control device 400 from the advertising packet, the terminal 100 may apply the first threshold distance to determining whether the user has the intention of accessing the first control device 400 and/or the first target region since the first control device 400 is not registered at the server as a walk-through control device.

In another example, the second control device 500 may be registered as a walk-through control device by other device than the terminal 100 or the second control device 500. In this case, the terminal 100 may acquire the identification information and/or region identification of the second control device 500 from the second control device 500, may provide the identification information and/or region identification information of the second control device 500 to the server, and may acquire information indicating that the second control device 500 is registered as a walk-through control device from the server. The terminal 100 may apply the second threshold distance to determining whether the user has the intention of accessing the second target region.

In addition, in an embodiment, the terminal 100 may include information regarding at least one RSSI value for determining the first threshold distance or the second threshold distance.

For example, the terminal 100 may measure a RSSI value at every predetermined distance (for example, 10 cm, 50 cm, 100 cm) to the first control device 400 and the second control device 500, and may pre-store the measured RSSI values. In this case, since the first control device 400 is not registered at the server as a walk-through control device, the terminal 100 may apply the first threshold distance to determining whether the user has the intention of accessing the first target region, and may use a RSSI value corresponding to the pre-measured first threshold distance when determining whether a distance to the first control device 400 is within the first threshold distance. For example, when the first threshold distance is 10 cm and a RSSI value of a signal received from the first control device 400 is greater than a pre-stored RSSI value that is measured when the distance to the first control device 400 is 10 cm, the terminal 100 may determine that the user has the intention of accessing the first target region.

In addition, since the second control device 500 is registered at the server as a walk-through control device, the terminal 100 may apply the second threshold distance to determining whether the user has the intention of accessing the second target region, and may use a RSSI value corresponding to the pre-measured second threshold distance when determining whether a distance to the second control device 500 is within the second threshold distance. For example, when the second threshold distance is 100 cm and a RSSI value of a signal received from the second control device 500 is greater than a pre-stored RSSI value that is measured when the distance to the second control device 500 is 100 cm, the terminal 100 may determine that the user has the intention of accessing the second target region.

Referring back to FIG. 6, when the terminal 100 determines that the user of the terminal 100 has the intention of accessing the target region and has the authority to access the target region, the terminal 100 may determine to transmit authentication data to the control device 200. In addition, the terminal 100 may encrypt the authentication data. Herein, the authentication data may include authentication information based on which the access control device 200 allows access to the control device 200. For example, the authentication information may include a password, signature information, or an authentication key. In addition, the terminal 100 may pre-store authentication information of the control device 200. For example, the advertising packet that the terminal 100 acquires from the control device 200 may include authentication information of the access control device 200. In addition, the terminal 100 may already receive the authentication information of the control device 200 from the control device 200.

In addition, the terminal 100 may acquire the authentication information of the control device 200 from the server 300. For example, in the process of registering the control device 200 at the server 300 as described above with reference to FIG. 5, the control device 200 may transmit the authentication information of the control device 200 to the terminal 100 along with the encryption key of the control device 200, and the terminal 100 may transmit the authentication information of the control device 200 to the server 300 along with the encryption key of the control device 200. In addition, the server 300 may store the authentication information of the control device 200 along with the encryption key of the control device 200. Thereafter, in the process of the terminal 100 acquiring the encryption key of the control device 200 from the server 300 as described in FIG. 6, the terminal 100 may receive the authentication information of the control device 200 from the server 300 along with the encryption key of the control device 200.

According to an embodiment, the authentication information may include information regarding whether the user of the terminal 100 is a manager of the control device 200. The terminal 100 may include the information regarding whether the user of the terminal 100 is the manager of the control device 200 in the authentication information. In addition, according to an embodiment, the terminal 100 may receive the information regarding whether the user of the terminal 100 is the manager of the control device 200 from the server 300. For example, the server 300 may already include the information regarding whether the user of the terminal 100 is a normal user or the manager of the control device 200. In this case, in the process of the terminal 100 acquiring the encryption key of the control device 200 from the server 300 as described in FIG. 6, the terminal 100 may receive information regarding whether the user of the terminal 100 is the manager of the control device 200 from the server 300 as authentication information along with the encryption key of the control device 200.

In addition, the authentication data may include a random value that is included in the advertising packet acquired from the control device 200. In addition, according to an embodiment, the authentication data may include the random value, but may not include the authentication information of the control device 200, and the authentication data may include the authentication information of the control device 200 along with the random value.

In addition, the terminal 100 may encrypt the authentication data based on the encryption key of the control device 200, which is acquired from the server 300. In an embodiment, the terminal 100 may encrypt the authentication data in a shared key method. For example, the terminal 100 may encrypt the authentication data in the shared key method by using a public key of the control device 200 and a private key of the terminal 100, which are acquired from the server 300 described in FIG. 6.

In addition, the terminal 100 may determine an authentication data transmission method. Specifically, the terminal 100 may determine the authentication data transmission method based on version information of a communication protocol through which the terminal 100 communicates with the control device 200 (for example, version information of a communication protocol corresponding to the advertising packet received from the control device 200). For example, the version information of the communication protocol through which the terminal 100 communicates with the control device 200, that is, the version information of the communication protocol corresponding to the advertising packet, may be included in the advertising packet which is received from the control device 200.

In addition, the version information of the communication protocol through which the terminal 100 communicates with the control device 200 may be version information of a BLE communication protocol. In the following descriptions, the disclosure is described based on the version information of the BLE communication protocol for the convenience of explanation, but this should not be considered as limiting, and the explanation of the disclosure may be applied to other communication protocols than BLE.

When the version information of the communication protocol through which the terminal 100 communicates with the control device 200 is higher than or equal to a predetermined version, the terminal 100 may determine to transmit the encrypted authentication data by using the advertising packet. In this case, the terminal 100 may include the encrypted authentication data in an advertising packet, and may transmit the advertising packet to the control device 200 to transmit the encrypted authentication data to the control device 200.

In an embodiment, when the version of the communication protocol is a version that supports an advertising packet of a large size so as to include the encrypted authentication data in the advertising packet, the terminal 100 may determine to transmit the encrypted authentication data by using the advertising packet. For example, when the version of the BLE communication protocol is lower than 5.0, maximum data of 31 bytes may be included in the advertising packet, but, when the version of the BLE communication protocol is higher than or equal to 5.0, maximum data of 251 bytes may be included in the advertising packet. Accordingly, when the encrypted authentication data is 168 bytes long and the version of the BLE communication protocol is lower than 5.0, the encrypted authentication data may not be included in the advertising packet. However, when the version of the BLE communication protocol is higher than or equal to 5.0, the encrypted authentication data may be included in the advertising packet.

Accordingly, when the version of the communication protocol is a version that supports an advertising packet of a large size so as to include the encrypted authentication data in the advertising packet, that is, when the version of the BLE communication protocol is higher than or equal to 5.0, the terminal 100 may determine to transmit the encrypted authentication data by using the advertising packet. In addition, when the version of the communication protocol is not a version that supports an advertising packet of a large size so as to include the encrypted authentication data in the advertising packet, that is, the version of the BLE communication protocol is lower than 5.0, the terminal 100 may establish a communication channel with the control device 200 without using the advertising packet, and may transmit the encrypted authentication data to the control device 200 through the communication channel.

In addition, the terminal 100 may transmit the encrypted authentication data to the control device 200 in the determined authentication data transmission method. In addition, the control device 200 may decrypt the encrypted authentication data, and may perform user authentication based on the decrypted authentication data. In addition, the control device 200 may transmit a user authentication result to the terminal 100. In addition, the terminal 100 may transmit the user authentication result received from the control device 200 to the server 300.

Hereinafter, the disclosure will be described in detail with reference to FIG. 8.

Figure 8A:
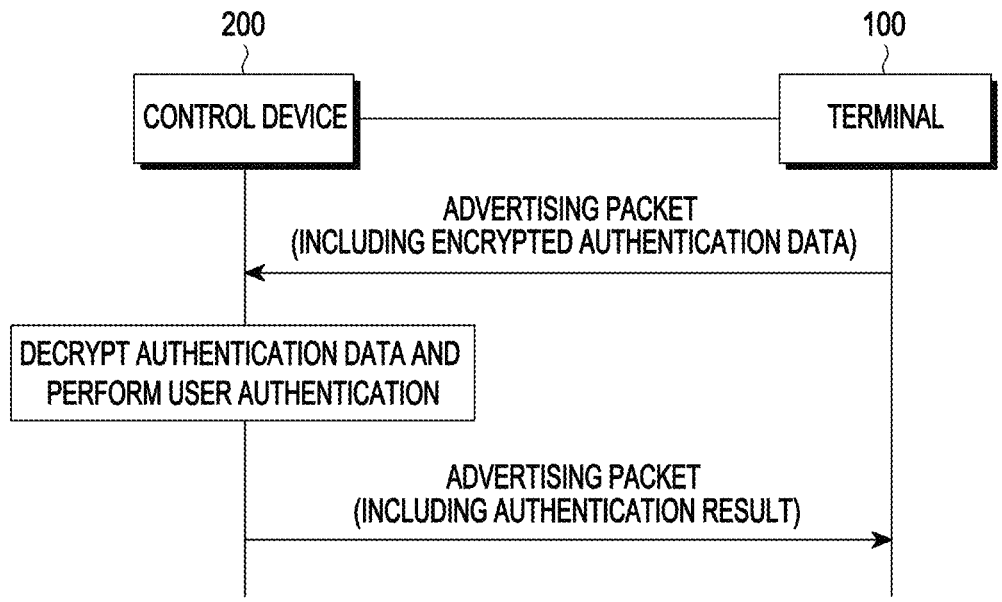
FIGS. 8A and 8B are a view provided to explain operations of the terminal and the control device according to an authentication data transmission method according to an embodiment.
Figure 8B:
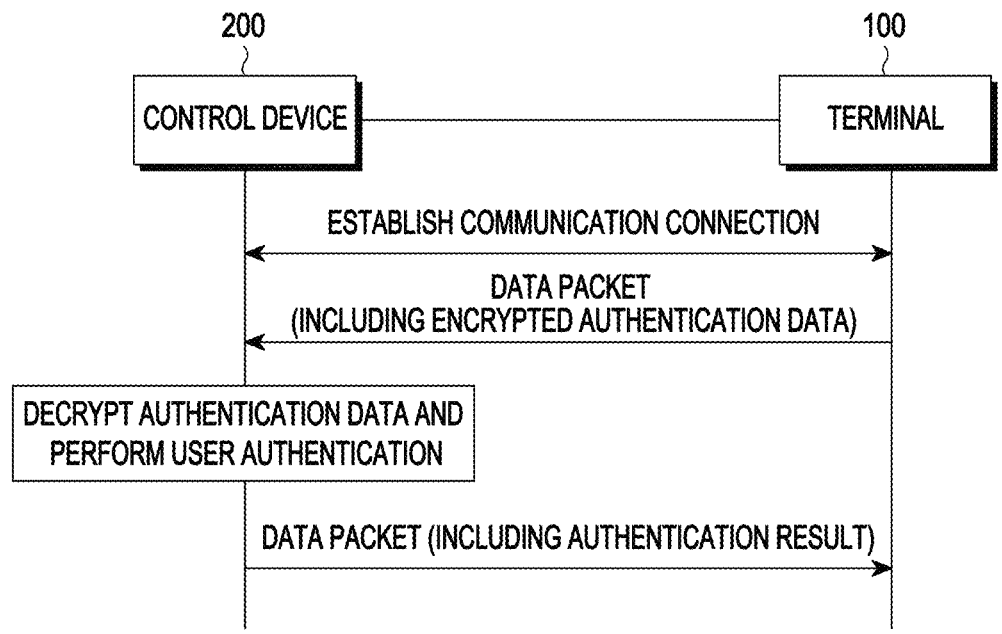

FIG. 8A and FIG. 8B are a view provided to explain operations of the terminal and the control device according to an authentication data transmission method according to an embodiment.

Referring to FIG. 8A, FIG. 8A illustrates operations of the terminal 100 and the control device 200 when authentication data is transmitted by using an advertising packet. In FIG. 8A, when the version of the communication protocol is a version that supports an advertising packet of a large size so as to include encrypted authentication data in the advertising packet, that is, when the version of the BLE communication protocol is higher than or equal to 5.0, the terminal 100 may determine to transmit the encrypted authentication data by using an advertising packet. Specifically, the terminal 100 may include encrypted data and identification information (universally unique identifier (UUID)) in the advertising packet. Herein, the identification information refers to identification information of the control device 200 (for example, a device serial number of the control device 200), and may be included in the advertising packet that the terminal 100 acquires from the control device 200. The identification information of the control device 200 is included in the advertising packet to be provided to the control device 200 from the terminal, so that the control device 200 identifies that the advertising packet acquired from the terminal 100 includes the identification information of the control device 200, and accordingly, the control device 200 identifies that the terminal 100 has received the advertising packet broadcasted by the control device 200.

In addition, in an embodiment, the terminal 100 may add a random value to the advertising packet. Herein, the random value may be included in the advertising packet that the terminal 100 acquires from the control device 200. The random value provided by the control device 200 is included in the advertising packet that the terminal 100 provides to the control device 200, so that the control device 200 can identify whether the random value provided by the control device 200 is identical to the random value acquired from the terminal 100. When the random values are identical to each other, the control device 200 may identify that the terminal 100 has received the advertising packet broadcasted by the control device 200. In addition, according to an embodiment, the random value may be included in the advertising packet independently from the encrypted authentication data, and in this case, the random value may be included in the advertising packet without being encrypted, unlike the encrypted authentication data.

In addition, in an embodiment, the terminal 100 may add an encryption key of the terminal 100 (for example, a public key of the terminal 100) to the advertising packet. The encryption key of the terminal 100 may be used to decrypt the encrypted authentication data included in the advertising packet. In addition, according to an embodiment, the encryption key of the terminal 100 may be included in the advertising packet independently from the encrypted authentication data, and in this case, the encryption key of the terminal 100 may be included in the advertising packet without being encrypted, unlike the encrypted authentication data.

The terminal 100 may broadcast the advertising packet, and, when the control device 200 is positioned at a predetermined distance from the terminal 100, the control device 200 may receive the advertising packet from the terminal 100.

In addition, the control device 200 may decrypt the encrypted authentication data and may perform user authentication. In an embodiment, the control device 200 may decrypt the encrypted authentication data which is included in the advertising packet by using the encryption key of the terminal 100 (for example, the public key of the terminal 100). For example, the encryption key of the terminal 100 may be included in the advertising packet which is transmitted from the terminal 100. In addition, the encrypted authentication data may be encrypted by the terminal 100 based on a public key of the control device 200 along with the private key of the terminal 100. The control device 200 may decrypt the encrypted authentication data by using a private key corresponding to the public key of the control device 200, along with the public key of the terminal 100 included in the advertising packet.

In addition, the control device 200 may verify validity of the authentication data based on the random value. As described above, the random value may be included in the authentication data or may be included in the advertising packet independently from the authentication data. The control device 200 may determine whether the random value received from the terminal 100 matches the random value included in the advertising packet that the control device 200 previously broadcasts, and, when the random values match each other, the control device 200 may determine that the authentication data received from the terminal 100 is valid. When the random values do not match each other, the control device 200 may determine that the authentication data received from the terminal 100 is not valid, and may determine that the user is not authenticated.

In addition, the control device 200 may verify validity of the authentication data based on the identification information (UUID) included in the advertising packet. The control device 200 may determine whether the identification information (UUID) included in the advertising packet received from the terminal 100 matches the identification information of the control device 200 included in the advertising packet that the control device 200 previously broadcasts, and, when the identification information matches, the control device 200 may determine that the authentication data received from the terminal 100 is valid. When the identification information does not match, the control device 200 may determine that the authentication data received from the terminal 100 is not valid, and may determine that the user is not authenticated.

In addition, the control device 200 may verify validity of the authentication data based on signature information which is included in the authentication information. As described above with reference to FIG. 5, the control device 200 may acquire a control device-dedicated encryption key provided by the server 300 through the terminal 100 in the registering process of the control device 200. The control device 200 may verify signature information included in the authentication information by using the control device-dedicated encryption key. For example, the server 300 may generate signature information of the control device 200 by using a control device-dedicated public key assigned to the control device 200, and may transmit the generated signature information to the terminal 100. The terminal 100 may include the signature information received from the server 300 in authentication information, and may transmit the encrypted authentication data including the authentication information to the control device 200. In addition, the control device 200 may decrypt the authentication data and may identify the signature information extracted from the authentication data, and may verify the signature information by using the control device-dedicated public key. For example, the control device 200 may verify the signature information by using a digital signature algorithm (DSA). When the signature information is valid as a result of verifying, the control device 200 may determine that the authentication data received from the terminal 100 is valid. On the other hand, when it is determined that the signature information is not valid as a result of verifying, the control device 200 may determine that the authentication data received from the terminal 100 is not valid, and may determine that the user is not authenticated.

In addition, the control device 200 may perform user authentication based on the authentication information included in the decrypted authentication data. For example, when the authentication information includes a password or an authentication key, the control device 200 may determine whether the password or authentication key included in the authentication data matches a pre-stored password or authentication key, and, when the password or authentication key matches, the control device 200 may determine that the user is authenticated. Determining that the user is authenticated may indicate that the control device 200 determines that the terminal 100 or the user of the terminal 100 has the authority to access the target region.

In addition, the control device 200 may include information on the result of the user authentication in an advertising packet, and may broadcast the advertising packet. When the terminal 100 is positioned at a predetermined distance from the control device 200, the terminal 100 may acquire the advertising packet and may acquire the information on the result of the user authentication which is included in the advertising packet. In addition, the terminal 100 may transmit the result of the user authentication received from the control device 200 to the server 300.

As described above, the terminal 100 transmits the authentication data by using the advertising packet, so that the number of times of transmission of packets between the terminal 100 and the control device 200 can be reduced compared to the case in which authentication data is transmitted through a communication channel. Accordingly, a speed for user authentication can be enhanced. In addition, when the operating system of the terminal 100 is Android and scanning start, communication connection, and scanning interruption are repeated, scanning may be prohibited at the terminal 100 by the operating system for a predetermined time. In this case, a communication connection is not established for the predetermined time and hence the terminal 100 is unable to transmit authentication data to the control device 200, and accordingly, user authentication may be interrupted. However, when the terminal 100 transmits authentication data by using an advertising packet, user authentication may be completed in a scanning start state, and scanning may not be prohibited, and accordingly, time required to perform user authentication may be reduced. That is, the terminal 100 transmitting authentication data through a communication channel may be effective in user authentication when the operating system of the terminal 100 is iOS, but the terminal 100 transmitting authentication data by using an advertising packet may be effective in user authentication even when the operating system of the terminal 100 is Android as well as iOS.

FIG. 8B illustrates operations of the terminal 100 and the control device 200 when authentication data is transmitted by using a communication channel. In FIG. 8B, when the version of the communication protocol is not a version that supports an advertising packet of a large size so as to include encrypted authentication data in the advertising packet, that is, the version of the BLE communication protocol is lower than 5.0, the terminal 100 may establish a communication channel with the control device 200 without using an advertising packet, and may transmit the encrypted authentication data to the control device 200 through the communication channel. Specifically, the terminal 100 may perform scanning and may connect to the control device 200 as described above, and accordingly, a communication channel may be established between the terminal 100 and the control device 200. The terminal 100 is able to transmit more data of various sizes to the control device 200 through the communication channel, and accordingly, may generate a data packet including encrypted authentication data and may transmit the generated data packet to the control device 200.

In addition, the terminal 100 may transmit the above-described random value to the control device 200 through the communication channel. For example, the terminal 100 may include the random value in the data packet, and may transmit the data packet to the control device 200.

In addition, the terminal 100 may transmit an encryption key of the terminal 100 (for example, a public key of the terminal 100) to the control device 200 through the communication channel. For example, the terminal 100 may include the encryption key of the terminal 100 (for example, the public key of the terminal 100) in the data packet, and may transmit the data packet to the control device 200.

In addition, the control device 200 may decrypt the encrypted authentication data and may perform user authentication. The contents explained in FIG. 8A may be applied to decryption of the encrypted authentication data and the user authentication, and thus a detailed description is omitted.

In addition, the control device 200 may provide information regarding a result of user authentication to the terminal 100 through the communication channel. The control device 200 may generate a data packet including the information regarding the result of the user authentication, and may transmit the generated data packet to the terminal 100. In addition, the control device 200 may transmit the information regarding the result of the user authentication to the terminal by writing.

In addition, the control device 200 may include the information regarding the result of the user authentication in an advertising packet, and may broadcast the advertising packet. When the terminal 100 is positioned at a predetermined distance from the control device 200, the terminal 100 may acquire the advertising packet and may acquire the information regarding the result of the user authentication which is included in the advertising packet. In addition, the terminal 100 may transmit the result of the user authentication received from the control device 200 to the server 300.

For example, when multiple control devices 200 are positioned at a company and the user of the terminal 100 is a staff of the company, the terminal 100 or the server 300 may perform commuting time recording for the user of the terminal 100. Specifically, a rule about commuting time recording may be set at the terminal 100 or the server 300. For example, the terminal 100 or the server 300 may pre-set a predetermined attendance timeslot and a predetermined office-leaving timeslot. For example, the terminal 100 or the server 300 may set a time slot from 5 a.m. to 10 a.m. to the attendance timeslot, and may set a timeslot from 5 p.m. to 5 a.m. of the next day to the office-leaving timeslot.

In an embodiment, when the terminal 100 performs commuting time recording for the user of the terminal 100, the terminal 100 may perform attendance recording for the user of the terminal 100 based on an advertising signal or a user authentication result which is received from the control device 200 for the first time in the pre-set attendance timeslot. For example, when the terminal 100 receives an advertising signal at 6 a.m. and receives at 9 a.m. in the pre-set attendance timeslot from 5 a.m. to 10 a.m., the terminal 100 may record 6 a.m. as the attendance time of the user. In addition, when the terminal 100 receives a user authentication result from the control device 200 at 7 a.m. and then receives at 10 a.m., the terminal 100 may record 7 a.m. as the attendance time of the user. In addition, the terminal 100 may perform office-leaving time recording for the user of the terminal 100 based on an advertising signal or a user authentication result which is received from the control device 200 lastly in the pre-set office-leaving timeslot. For example, when the terminal 100 receives an advertising signal at 6 p.m. and receives at 9 p.m. in the pre-set office-leaving timeslot from 5 p.m. to 5 a.m. of the next day, the terminal 100 may record 9 p.m. as the office-leaving time of the user. In addition, when the terminal 100 receives a user authentication result from the control device 200 at 8 p.m. and then receives at 1 a.m. of the next day, the terminal 100 may record 1 a.m. of the next day as the office-leaving time of the user.

In addition, in an embodiment, when the commuting time recording for the user of the terminal 100 is performed at the server 300, the server 300 may perform attendance recording for the user of the terminal 100 based on an encryption key request of the control device 200 or a user authentication result which is received from the terminal 100 for the first time in the pre-set attendance timeslot. For example, when the server 300 receives an encryption key request of the control device 200 from the terminal 100 at 6 a.m. and receives at 9 a.m. in the pre-set attendance timeslot from 5 a.m. to 10 a.m., the server 300 may record 6 a.m. as the attendance time of the user. In addition, when the server 300 receives a user authentication result from the terminal 100 at 7 a.m. and then receives at 10 a.m., the server 300 may record 7 a.m. as the attendance time of the user. In addition, the server 300 may perform office-leaving time recording for the user of the terminal 100 based on an encryption key request of the control device 200 or a user authentication result which is received from the terminal 100 lastly in the pre-set office-leaving timeslot. For example, when the server 300 receives an encryption key request of the control device 200 from the terminal 100 at 6 p.m. and receives at 9 p.m. in the pre-set office-leaving timeslot from 5 p.m. to 5 a.m. of the next day, the server 300 may record 9 p.m. as the office-leaving time of the user. In addition, when the server 300 receives a user authentication result from the terminal 100 200 at 8 p.m. and then receives at 1 a.m. of the next day, the server 300 may record 1 a.m. of the next day as the office-leaving time of the user.

In addition, the terminal 100 may perform anti-pass back (APB) control with respect to the user of the terminal 100 when managing access. For example, when there are a plurality of control devices disposed, a third control device may be configured to control entrance to the inside of a target region from the outside, and a fourth control device may be configured to control exit from the inside of the target region to the outside. Since the third control device and the fourth control device perform the above-described operations of the control device 200, a detailed description thereof is omitted.

In addition, the server 300 may configure the third control device to control entrance to the inside from the outside and configure the fourth control device to control exit from the inside to the outside. For example, the server 300 may configure the roles of the third control device and the fourth control device by controlling setting from the outside. In addition, in the process of registering as described above with reference to FIG. 5, the third control device may transmit information regarding the role of controlling entrance of the third control device while transmitting an encryption key of the third control device to the terminal 100. In addition, the terminal 100 may transmit the information regarding the role of controlling entrance of the third control device while transmitting the encryption key of the third control device to the server 300, and the server 300 may configure the role of the third control device according to the received information. In addition, the role of the fourth control device may be configured at the server according to the same operation as that described above.

As described above with reference to FIG. 6, the terminal 100 may perform the anti-pass back control while determining whether the terminal has an authority to access a target region. In this case, the server 300 may transmit information regarding the role of the third control device or the fourth control device while transmitting an encryption key of the control device to the terminal 100. For example, the terminal 100 may receive an advertising signal from the third control device, may request an encryption key of the third control device from the server 300, and may receive the information regarding the role of the third control device while receiving the encryption key of the third control device from the server 300. In addition, the terminal 100 may determine whether the role of a control device that the terminal 100 accesses right before is the same as the role of the third control device. For example, the terminal 100 may access the fourth control device right before. For example, the terminal 100 may receive a user authentication result indicating that the user is authenticated from the fourth control device. In this case, the terminal 100 may receive the information regarding the role of the fourth control device from the server 300 in the process of accessing the fourth control device, and may identify that the fourth control device performs the role of controlling exit, based on the information regarding the role of the fourth control device. In addition, the terminal 100 may identify that the third control device performs the role of controlling entrance, by receiving the information regarding the role of the third control device from the server 300, and accordingly, may determine that the role of the fourth control device that the terminal accesses right before is not the same as the role of the third control device. Accordingly, the terminal 100 may determine that the user of the terminal 100 does not violate the anti-pass back policy, and, when it is determined that the terminal 100 has the authority to access the target region as a result of determining whether the terminal 100 has the authority to access the target region in FIG. 6, the terminal 100 may access the third control device. For example, the terminal 100 may determine whether to transmit authentication data to the third control device.

On the other hand, the terminal 100 may access the third control device or another control device that performs the role of controlling entrance right before. For example, the terminal 100 may receive a user authentication result indicating that the user is authenticated from the control device which performs the role of controlling entrance. In this case, in the process of accessing the control device which performs the role of controlling entrance, the terminal 100 may receive the information regarding the role of the control device that performs the role of controlling entrance from the server 300, and may identify that the control device performing the role of controlling entrance performs the role of controlling entrance, based on the information regarding the role of the control device performing the role of controlling entrance. In addition, the terminal 100 may identify that the third control device performs the role of controlling entrance, by receiving the information regarding the role of the third control device from the server 300, and accordingly, the terminal 100 may determine that the role of the control device that the terminal 100 accesses right before and performs the role of controlling access is the same as the role of the third control device. Accordingly, the terminal 100 may determine that the user of the terminal 100 violates the anti-pass back policy, and may determine that the user has no authority to access the target region even if it is determined that the user has the authority to access the target region as a result of determining the presence of the authority to access the target region in FIG. 6, and may not access the third control device. For example, the terminal 100 may not transmit authentication data to the third control device.

Methods according to embodiments may be implemented in the form of a program command that is executed through various computer means, and may be recorded on a computer-readable recording medium. The computer-readable recording medium may include a program command, a data file, a data structure independently or in combination. The program command recorded on the medium may be specifically designed and constructed for embodiments, or may be well known to and usable by a person skilled in the art of computer software. Examples of the computer-readable recording medium may include magnetic media such as a hard disk, a floppy disk, and a magnetic tape, optical media such as a CD-ROM, a DVD, magneto-optical media such as a floptical disk, and a hardware device specially configured to store and execute a program command, such as a ROM, a RAM, a flash memory. Examples of the program command may include not only a machine language code that is made by a complier but also a high-level language code that is executed by a computer by using an interpreter. The above-described hardware device may be configured to operate as one or more software modules to perform operations of the embodiments, or the reverse is the case.

Although embodiments have been described with reference to specified embodiments and drawings as described above, various modifications and changes may be made from the above descriptions by a person skilled in the art. For example, even when the above-described technologies are performed in a different order from that described above, and/or components of the above-described system, structure, device, circuit, etc. are coupled or combined in different forms from that described above, or are replaced or substituted with other components or equivalents, appropriate results may be achieved.

Therefore, other implementations, other embodiments, and equivalents to the scope of the claims belong to the scope of the claims presented below.

What is claimed is:

1. An authentication method of a terminal, the authentication method comprising:
   receiving a first advertising packet from a control device, wherein the first advertising packet comprising at least one of control device identification information for identifying the control device or region identification information for identifying a target region that is managed by the control device;
   requesting an encryption key of the control device from a server based on at least one of the control device identification information or the region identification information which is included in the first advertising packet;
   receiving the encryption key of the control device from the server;
   determining whether the terminal has an authority to access the target region, based on at least one of the control device identification information or the region identification information;
   encrypting authentication data to be transmitted to the control device based on the encryption key of the control device when it is determined that the terminal has the authority to access the target region; and
   transmitting the encrypted authentication data to the control device.

2. The authentication method of claim 1, wherein the encryption key of the control device is a public key of the control device.

3. The authentication method of claim 2, wherein encrypting comprises encrypting the authentication data by using the public key of the control device and a private key of the terminal.

4. The authentication method of claim 1, wherein determining whether the terminal has the authority to access the target region comprises determining whether the terminal has the authority to access the target region by comparing at least one of the control device identification information or the region identification information, and reference access authority information pre-stored in the terminal, the access authority information comprising at least one of region identification information of a region that the terminal has an authority to access, or device identification information of the control device that manages the region that the terminal has the authority to access.

5. The authentication method of claim 1, wherein the first advertising packet comprises version information of a communication protocol through which the control device communicates with the terminal.

6. The authentication method of claim 5, wherein transmitting the encrypted authentication data to the control device comprises determining a method for transmitting the encrypted authentication data to the control device based on the version information of the communication protocol.

7. The authentication method of claim 6, wherein transmitting the encrypted authentication data to the control device comprises:
   when it is determined that an advertising packet according to the version of the communication protocol is able to comprise the encrypted authentication data, based on the version information of the communication protocol, generating a second advertising packet comprising the encrypted authentication data; and
   transmitting the second advertising packet to the control device.

8. The authentication method of claim 6, wherein the second advertising packet comprises the control device identification information.

9. The authentication method of claim 6, wherein transmitting the encrypted authentication data to the control device comprises:
   when it is determined that an advertising packet according to the version of the communication protocol is not able to comprise the encrypted authentication data, based on the version information of the communication protocol, establishing a communication connection with the control device;

generating a data packet comprising the encrypted authentication data after establishing the communication connection with the control device; and transmitting the data packet to the control device.

10. The authentication method of claim 1, wherein transmitting the encrypted authentication data to the control device comprises:

determining a distance to the control device, based on a signal received from the control device; and when the determined distance is less than or equal to a threshold distance, transmitting the encrypted authentication data to the control device.

11. The authentication method of claim 10, wherein transmitting the encrypted authentication data to the control device comprises:

when the terminal identifies that the control device is registered at the server to apply a first threshold distance, and the determined distance is less than or equal to the first threshold distance, transmitting the encrypted authentication data to the control device.

12. The authentication method of claim 11, wherein transmitting the encrypted authentication data to the control device comprises:

when the terminal identifies that the control device is not registered at the server to apply the first threshold distance, and the determined distance is less than or equal to a second threshold distance which is shorter than the first threshold distance, transmitting the encrypted authentication data to the control device.

13. The authentication method of claim 11, further comprising:

acquiring the encryption key of the control device from the control device before the receiving a first advertising packet from a control device; and transmitting the encryption key of the control device to the server such that the encryption key of the control device is registered at the server.

14. The authentication method of claim 13, further comprising:

receiving, from the server, at least one of a control device-dedicated encryption key that is assigned to the control device by the server, or login information to the server, in response to the encryption key of the control device being transmitted to the server; and transmitting at least one of the control device-dedicated encryption key or the login information to the server to the control device.

15. The authentication method of claim 1, further comprising receiving information regarding a user authentication result based on the encrypted authentication data from the control device.

16. The authentication method of claim 15, wherein information regarding a predetermined attendance timeslot is pre-set, and wherein, in the predetermined attendance timeslot, a time at which an advertising signal that is early received from among a first advertising signal received from the control device or an advertising signal received from a second control device is received is set as an attendance time of a user of the terminal, or in the predetermined attendance timeslot, a time at which information regarding a user authentication result that is early received from among information regarding a user authentication result that is received from the control device, or information regarding a user authentication result that is received from the second control device is received is set as the attendance time of the user of the terminal.

17. The authentication method of claim 15, wherein information regarding a predetermined office-leaving timeslot is pre-set, and wherein, in the predetermined office-leaving timeslot, a time at which an advertising signal that is received late from among a first advertising signal received from the control device or an advertising signal received from a second control device is received is set as an office-leaving time of a user of the terminal, or in the predetermined office-leaving timeslot, a time at which information regarding a user authentication result that is received late from among information regarding a user authentication result that is received from the control device, or information regarding a user authentication result that is received from the second control device is received is set as the office-leaving time of the user of the terminal.

18. The authentication method of claim 1, further comprising:

receiving information regarding a role of the control device from the server, in response to a request for the encryption key of the control device, wherein the role of the control device comprising a role of controlling entrance to an inside of the target region from an outside, or a role of controlling exit from the inside of the target region to the outside;

determining whether a role of a control device that the terminal accesses right before is the same as the role of the control device, based on the information regarding the role of the control device; and when it is determined that the role of the control device that the terminal accesses right before is the same as the role of the control device, determining that the terminal has no authority to access the target region.

19. A non-transitory computer-readable recording medium storing a program configured for being executed by a processor to perform a method comprising:

receiving a first advertising packet from a control device, wherein the first advertising packet comprising at least one of control device identification information for identifying the control device or region identification information for identifying a target region that is managed by the control device;

requesting an encryption key of the control device from a server based on at least one of the control device identification information or the region identification information which is included in the first advertising packet;

receiving the encryption key of the control device from the server;

determining whether the terminal has an authority to access the target region, based on at least one of the control device identification information or the region identification information;

encrypting authentication data to be transmitted to the control device based on the encryption key of the control device when it is determined that the terminal has the authority to access the target region; and transmitting the encrypted authentication data to the control device.

20. A terminal comprising:
a communication engine; and
an integrated circuit,
wherein the integrated circuit is configured to:
- receive a first advertising packet from a control device through the communication engine, wherein the first advertising packet comprising at least one of control device identification information for identifying the control device or region identification information for identifying a target region that is managed by the control device;
- request an encryption key of the control device from a server through the communication engine, based on at least one of the control device identification information or the region identification information which is included in the first advertising packet;
- receive the encryption key of the control device from the server through the communication engine;
- determine whether the terminal has an authority to access the target region, based on at least one of the control device identification information or the region identification information;
- when it is determined that the terminal has the authority to access the target region, encrypt authentication data to be transmitted to the control device based on the encryption key of the control device; and
- transmit the encrypted authentication data to the control device through the communication engine.

* * * * *